US012569919B2

(12) United States Patent
Gunn

(10) Patent No.: US 12,569,919 B2
(45) Date of Patent: Mar. 10, 2026

(54) JAW ASSEMBLY

(71) Applicant: Record Power Limited, Derbyshire (GB)

(72) Inventor: Jeremy Gunn, Derbyshire (GB)

(73) Assignee: RECORD POWER LIMITED, Derbyshire (GB)

( * ) Notice: Subject to any disclaimer, the term of this patent is extended or adjusted under 35 U.S.C. 154(b) by 725 days.

(21) Appl. No.: 17/857,643

(22) Filed: Jul. 5, 2022

(65) Prior Publication Data

US 2023/0001489 A1      Jan. 5, 2023

(30) Foreign Application Priority Data

Jul. 5, 2021      (GB) ..................................... 2109663

(51) Int. Cl.
B23B 31/16         (2006.01)
B23B 31/10         (2006.01)

(52) U.S. Cl.
CPC ........ B23B 31/1627 (2013.01); B23B 31/102 (2013.01); B23B 31/16275 (2013.01); *B23B 2231/30* (2013.01); *B23B 2231/56* (2021.01)

(58) Field of Classification Search
CPC .............. B23B 31/102; B23B 31/1627; B23B 31/16275; B23B 31/16279; Y10T 279/1993; Y10T 279/3462; Y10T 279/3468; Y10T 279/3475
See application file for complete search history.

(56) References Cited

U.S. PATENT DOCUMENTS

| | | | | |
|---|---|---|---|---|
| 2,820,640 | A | * | 1/1958 | Regan ................. B23B 31/2073 |
| | | | | 279/43.6 |
| 3,747,945 | A | * | 7/1973 | Bailiff ................... B23B 31/102 |
| | | | | 29/559 |
| 4,046,390 | A | * | 9/1977 | Dunham ............... B23B 31/202 |
| | | | | 279/156 |
| 4,221,391 | A | * | 9/1980 | Dutton .............. B23B 31/16275 |
| | | | | 269/271 |
| 5,542,686 | A | * | 8/1996 | Revuelta ........... B23B 31/16275 |
| | | | | 279/123 |
| 5,842,704 | A | * | 12/1998 | Gilliam ............. B23B 31/16279 |
| | | | | 279/124 |
| 5,979,914 | A | * | 11/1999 | Reyes ............... B23B 31/16275 |
| | | | | 279/154 |
| 9,492,874 | B2 | * | 11/2016 | Maurer ............. B23B 31/16045 |

FOREIGN PATENT DOCUMENTS

JP         H1037454 A      2/1998

* cited by examiner

*Primary Examiner* — Eric A. Gates

(74) *Attorney, Agent, or Firm* — Bond Schoeneck & King, PLLC; Joseph M. Noto

(57) ABSTRACT

The present disclosure provides a jaw assembly for mounting to a lathe spindle. The jaw assembly comprises a first jaw set with at least one axially extending jaw portion which comprises a channel extending in the same axial direction as the jaw portion, and a second jaw set locatable within and releasably attached to the first jaw set via at least one fastener locatable in the channel.

19 Claims, 3 Drawing Sheets

JAW ASSEMBLY

This application claims the benefit of Great Britain Patent Application No. 2109663.1, filed Jul. 5, 2021, which is hereby incorporated by reference in its entirety.

The present disclosure comprises a jaw assembly for a woodturning lathe, particularly jaw sets to be mounted to a chuck of a woodturning lathe.

INTRODUCTION

Woodturning lathes are generally used by hobbyists and enthusiasts for producing items such as bowls in low or singular batches. The material to be machined is held in position in the lathe with a first mandrel at one end, and optionally a second mandrel at the opposing end, whilst being rotated. At least one mandrel comprises a chuck that is typically threaded to a lathe spindle. A set of jaws on the chuck are used to clamp an object in position such that it can be rotated at high speeds safely.

The jaws may be specialised for specific functions, for example clamping a particular type of profile, geometry or size. Where a different jaw set is required, the existing jaws have to be dismounted from the chuck allowing for the new set to be installed. This becomes time consuming as an entire jaw set may comprise upwards of eight bolts mounting it to the chuck. The bolts may also not be easy to reach, particularly when using smaller chucks and where inner bolts are located within an axially extending portion of the jaw set. Furthermore, when the chuck is mounted to the lathe, the bolts have to be screwed in laterally increasing the chances of them being dropped.

Chucks may also only be compatible with a small number of different jaws, typically ones of similar size. This has cost implications for the operator as additional chucks may be required for mounting different jaw sets.

It is the aim of the present invention to provide a jaw assembly that overcomes or mitigates one or more of the problems addressed above.

SUMMARY OF INVENTION

According to a first aspect of the invention, there is a jaw assembly for mounting to a woodworking lathe, comprising;

a first jaw set comprising an axially extending jaw portion, wherein the jaw portion comprises at least one channel that extends in the same axial direction as the jaw portion, a second jaw set that is at least partially coaxially locatable within the first jaw set, wherein the first and second jaw sets are releasably attachable via at least one fastener located in the channel.

Optionally, the jaw assembly may comprise a first condition where the first jaw set is mounted to a lathe chuck or spindle.

Optionally, the first jaw set is suitable for clamping a material to be machined in the first condition.

Optionally, the jaw assembly may comprise a second condition wherein the second jaw set is suitable for clamping a material to be machined whilst being mounted to the first jaw set.

The first and second jaw sets may be distinct, such that the first jaw set may be suitable for machining a material that is different in shape and/or a dimensional range than a material that is suitable for being machined in the second jaw set.

The first jaw set may be releasably attached to a lathe chuck/spindle that is configured for receiving the first jaw set. The fastener attaches the first and second jaw sets together. The first jaw set then acts as an intermediate member between the chuck/spindle and second set, such that the second jaw set can clamp an item without the need for changing the lathe chuck for one that is suitable for receiving the second jaw set.

Alternatively, the first jaw set may not be suitable for clamping a material in the first position such that its primary function is to act as an intermediate member to the second jaw set in the second condition.

Optionally, the channel comprises an open-end that may be suitable for receiving the fastener.

Optionally, the channel may comprise a recess.

Optionally, the recess may be located proximal to a closed-end of the channel.

Optionally, the recess may be tapered.

Optionally, the depth of the channel may vary along its axial length.

Optionally, the depth of the channel may be lowest in the recess.

The channel serves as a quick attachment & release mechanism, such that the first and second jaw sets may be easily attached and detached. The recess is suitable for receiving a portion of the fastener.

Optionally, the fastener comprises a bolt.

Optionally, the bolt may comprise a bolt-head suitable for locating in the channel, optionally in the recess thereof.

Optionally, the fastener, e.g. the bolt thereof, may comprise a stem, where the stem may be partially threaded.

Optionally, the stem may be suitable for locating through the open-end of the channel.

Optionally, the bolt-head may be tapered.

The tapered recess may complement the tapered shape of the bolt-head. The width of the bolt-head may be greater than the width of the channel. The depth of the channel is lower in the recess than at the open-end such that when the bolt-head is located/fastened into the recess, the fastener is prevented from slipping axially from the channel in operation.

Optionally, the fastener may be a captive fastener. The fastener may remain retained on the second jaw set when released from the first jaw set. The fastener may be slidable along the channel, e.g. when removing the first jaw set form the second jaw set.

Optionally, the fastener may comprise a cap that may be suitable for keeping the fastener captive on the second jaw set.

Optionally, the cap may be at a first end of the fastener, e.g. the bolt thereof, and the bolt-head may be at the second end.

Optionally, the cap and bolt-head may be configured such as to prevent the fastener detaching from the second jaw set.

Optionally, the cap comprises a washer.

Optionally, the cap may comprise a screw portion.

Optionally, the fastener, e.g. the stem thereof, and cap may comprise complementary engagement members.

Optionally, the fastener, e.g. the stem thereof, may comprise a recess. The recess may be threaded such as to engage with a screw portion of the cap.

Optionally, the first jaw set comprises a plurality of first jaw members, optionally four members.

Optionally, each of the first jaw members may comprise an axially extending jaw portion.

Optionally, each of the jaw portions of the first jaw members comprises a channel that may extend in the same axial direction as the jaw portion.

Optionally, the second jaw set comprises a plurality of second jaw members, optionally four members.

Optionally, the number of first and second jaw members are equal.

Optionally, each of the first jaw members are releasably attached to a second jaw member via a fastener.

Optionally, the second jaw members may comprise a base and/or jaw portion.

Optionally, the second jaw set, e.g. the plurality of second jaw members thereof, each comprise an aperture for receiving a fastener. The aperture may be threaded.

Optionally, the aperture may be located in the side wall of the base portion.

The fasteners may engage with the second jaw member via the aperture. The fastener is located through the aperture and the cap is threaded into the recess of the stem.

Both the cap and bolt-head may be larger in size than the apertures of the second jaw members, such as to prevent the fastener and second jaw member from disengaging unwillingly.

Once the fastener is attached to the second jaw set, e.g. the second jaw members thereof, the second jaw set can be attached to the first jaw set, e.g. the first jaw members thereof, by sliding the fastener into the open-end of the channel. The fastener e.g. the bolt thereof, can then be tightened/fastened by screwing the threaded portion of the bolt into the second jaw members.

The fastener also serves as a guide for mounting the second jaw set, e.g. the second jaw members thereof, to the first jaw set, e.g. the first jaw members thereof. The open-end allows the fastener to remain captive on the second jaw set, such that both jaw sets can be attached and detached without disengaging the fastener from the second jaw set. This also makes it far easier to install and can be done easily by one person. For example, if the fastener were not captive such as to allow it to locate into an aperture/hole of the first jaw set (instead of a channel), a second person may be required to hold both jaw sets in alignment whilst a first person inserts the bolt and fastens a nut. The proposed channel method is also less cumbersome, and mitigates completely the chances of pieces such as bolts, screws or nuts being dropped whilst mounting the jaw sets together.

Optionally, the first jaw set, e.g. the first jaw members thereof, may comprise a back plate, wherein the back plate may be suitable for being releasably mounted to a lathe chuck.

Optionally, the back plate may comprise engagement portions, for engagement with a lathe chuck.

Optionally, the back plate engagement portions may be ribs and/or grooves.

Optionally, the jaw portion may extend from the back plate.

Optionally, the first jaw set, e.g. the first jaw members thereof, may each comprise a first mounting aperture for receiving an engagement member, e.g. a bolt, for attachment of the first jaw member to a lathe chuck.

Optionally, the first jaw set, e.g. the first jaw members thereof, may each comprise a second mounting aperture for receiving an engagement member, e.g. a bolt, for attachment of the first jaw member to a lathe chuck.

Optionally, the first and second mounting apertures may be located either side of the jaw portion.

Optionally, the jaw portions of the first jaw members may be arched shaped.

The jaw portions may be arched such that when all the first jaw members are aligned, the jaw portions are suitable for clamping an item to be machined.

Optionally, the first jaw members, e.g. the jaw portions thereof, comprise a ledge.

Optionally, the second jaw set, e.g. the jaw members thereof, may comprise an engagement surface that complements the shape of the ledge of the first jaw set.

Optionally, the ledge of the first jaw members e.g. the jaw portion thereof, are suitable for engagement with the second jaw members, e.g. the engagement surface thereof, in the second condition.

Optionally, the first and second jaw sets, e.g. the jaw members thereof, may comprise at least one engagement portion, suitable for clamping onto or within a spigot of an item to be machined.

Optionally, the at least one engagement portions of the first and/or second members may be dove-tailed or serrated.

Optionally, the at least one engagement portions of the first and/or second jaw members may protrude from the jaw portions of the first and/or second jaw members.

Optionally, the ledge may also serve as an engagement portion, such as to clamp an object in the first condition.

The jaw portion and/or engagement portions of the first and second jaw members may be distinct, such that the first jaw set may be suitable for machining materials of dimensions within a specified range and the second jaw set may be suitable for machining materials within a different specified range. Alternatively, the distinction may allow for the first set to machine a material with a specific profile, e.g. square, whereas the second jaw may be suitable for machining a material with a different profile, e.g. circular.

Optionally, the assembly may comprise a plurality of second jaw sets.

Optionally, the plurality of second jaw sets may be substantially the same as the second jaw set, e.g. in respect of associated fastening arrangements.

Optionally, the plurality of second jaw sets may be interchangeable, such that any of the plurality of second jaw sets may be configured to be releasably attached and coaxially locatable within the first jaw set via a fastener.

Optionally, the plurality of second jaw sets may each comprise a unique jaw portion such as to provide a specific jaw profile for clamping objects to be machined.

Optionally, the plurality of second jaw sets may each comprise at least one unique engagement portion, such as to provide a specific jaw profile for clamping a spigot of an object to be machined.

Optionally, the plurality of second jaw sets may each comprise unique first and/or second engagement portions.

The jaw assembly may comprise a plurality of second jaw sets, wherein the second jaw sets are all interchangeable such that they may be releasably attached to the first jaw set. The additional jaw sets comprise different jaw portions and/or engagement portions such that they are each specialised for clamping objects to be machined. For example, each of the second jaw sets may be suitable for clamping a specific diameter or range. Other second jaw sets may be suitable for clamping specific profiles.

According to another aspect of the invention, there is a method of using a jaw assembly, comprising the steps of, mounting the first jaw set to a lathe chuck/spindle, locating a second jaw set with a fastener coaxially within the first jaw set, such that the fastener locates into the channel, and fastening the fastener such that the first and second jaw sets are locked together.

Optionally, the fastener may be passed through an open-end of the channel.

According to a further aspect of the invention, there is a jaw set comprising, at least one axially extending jaw portion, wherein each at least one jaw portion comprises a channel that extends in the same axial direction as the jaw portion.

According to a further aspect of the invention, there is a jaw set comprising, at least one axially extending jaw portion, wherein each at least one jaw portion comprises a fastener extending radially from the jaw portion.

Any of the optional or essential features defined in relation to any one aspect of the invention above may be applied to any further aspect, wherever practicable. Those optional feature combinations have not been explicitly repeated only for conciseness.

Any reference herein to a lathe chuck herein may be construed more generally to refer to attachment to a lathe spindle. The invention is particularly configured for use with a woodworking lathe, e.g. in a workshop environment, where manual interchange of jaw sets is required for accommodating workpieces of different width/diameter.

Workable embodiments of the invention are described in further detail below, by way of example only, with reference to the accompanying drawings, of which:

DETAILED DESCRIPTION OF FIGURES

FIGS. 1-5 show a jaw assembly comprising a first jaw set, a second jaw set and a fastener according to a preferred embodiment of the invention.

Figure 1:
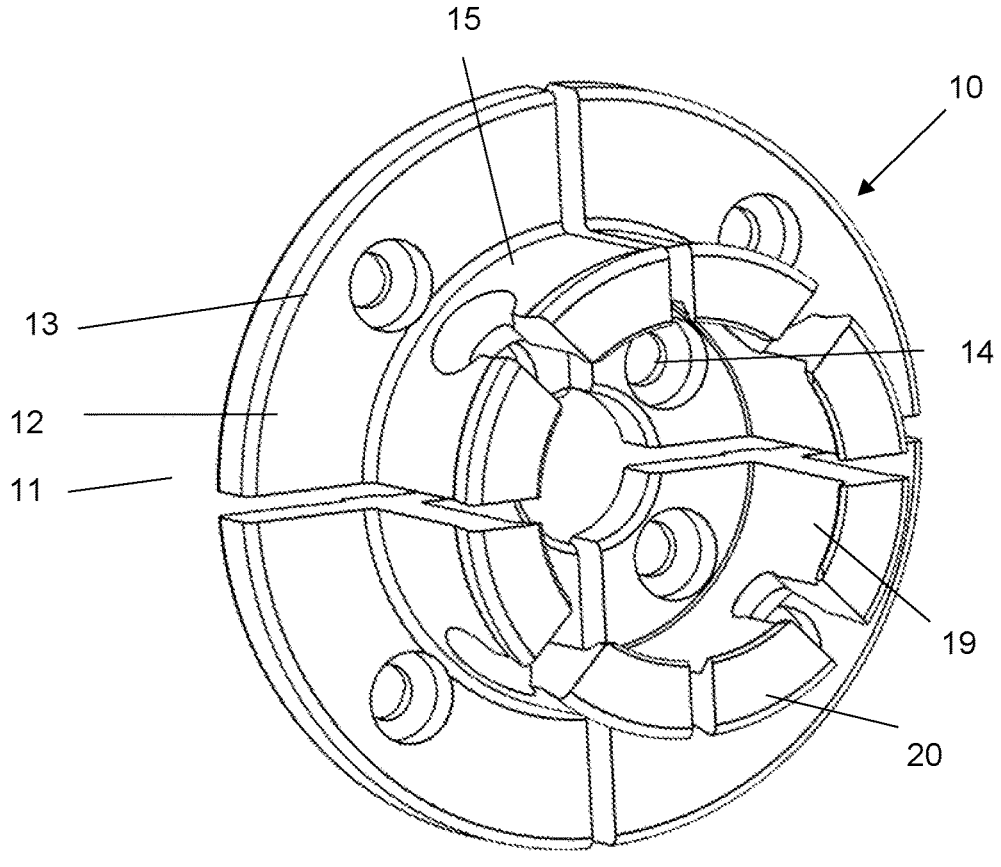
FIG. 1 shows a 3D view of a first jaw set.

The first jaw set 10 is shown in FIG. 1 in isolation. The first jaw set 10 is suitable for being mounted to a chuck lathe and is comprised of four first jaw members 11. Each of the first jaw members 11 are identical in size & shape and thus the first jaw set will be described by reference to one of the first jaw members 11.

Each first jaw member 11 comprises a back plate 12 which is suitable for being mounted to a lathe chuck. First 13 and second 14 mounting apertures are located in the back plate and are suitable for receiving an engagement member, such as a bolt, to mount onto a chuck. However, other forms of engagement between the chuck and first jaw members are envisioned (e.g. screws, clips, bayonets etc)

A jaw portion 15 extends axially from the back plate between the first 13 and second 14 mounting apertures and is arched in shape, such that the collection of jaw portions 15 is suitable for clamping an item. The jaw portion further comprises a ledge 19 that protrudes radially inwardly and is proximal to the open-end 17 of the channel 16.

Figure 2:
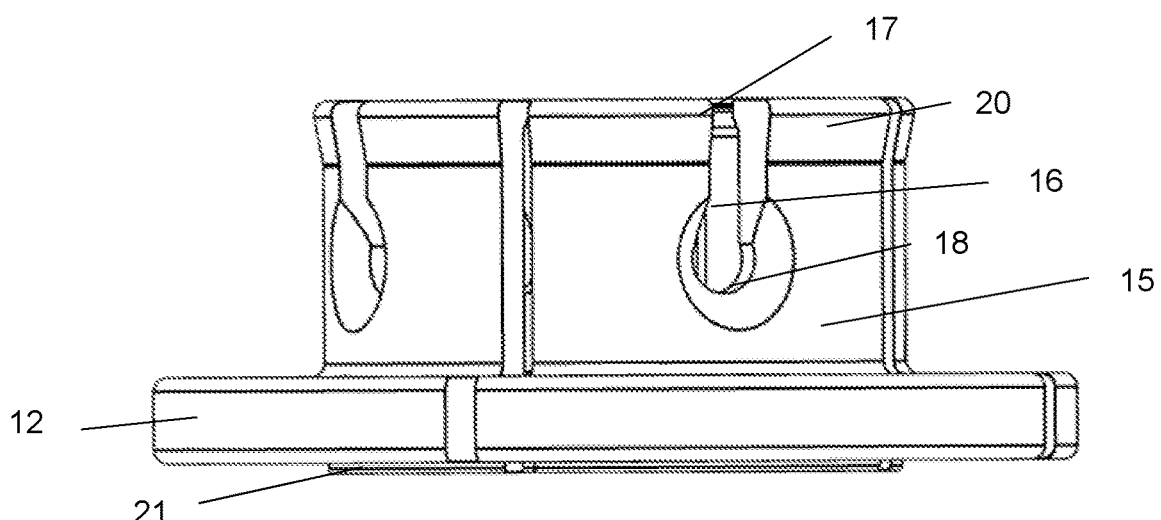
FIG. 2 shows a side-view of a first jaw set.

Best shown in FIG. 2, the jaw portion 15 further comprises a channel 16 that extends from an open-end 17 to a tapered recess 18. The depth of the channel 16 varies along the length and is lower in the recess with respect to the open-end 17.

The back plate 12 comprises a circular rib 21 and grooves (not shown) that engage with complementary profiles on the chuck.

Figure 3:
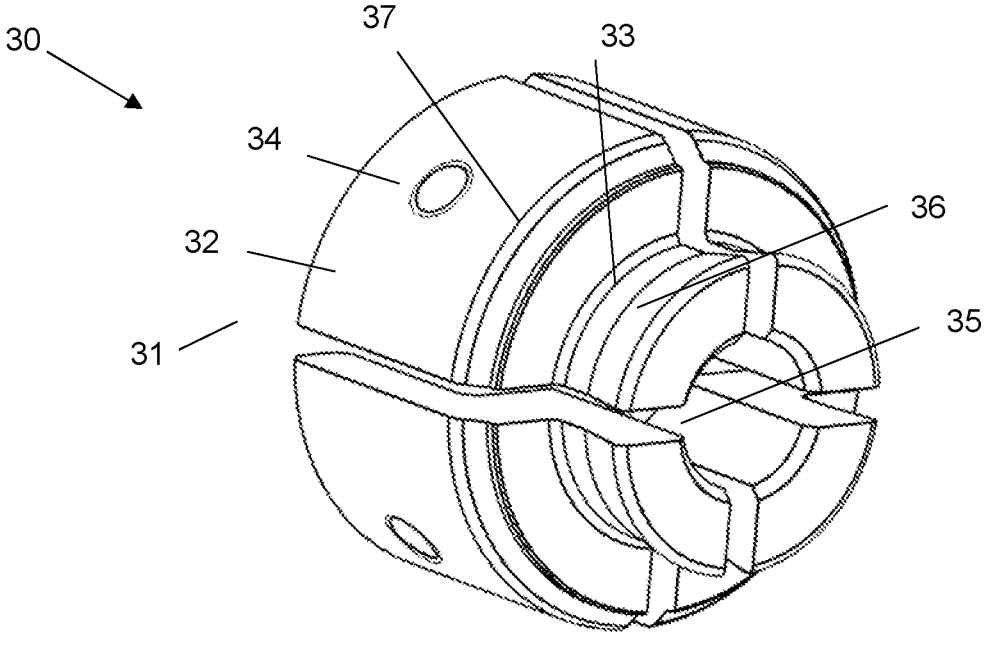
FIG. 3 shows a 3D view of a second jaw set.

FIG. 3 shows a second jaw set 30 comprised of four second jaw members 31. Each second jaw member 31 comprises a base 32 and jaw portion 33 extending therefrom. A threaded aperture 34 is located in the side wall of the base portion 32. The upper rim of the base portion 32 forms an engagement surface 37 that is complementary shaped to the ledge 19 of the first jaw set 10. The inner surface 35 of the jaw portion 33 is suitable to clamp around the periphery an object.

Figure 4:
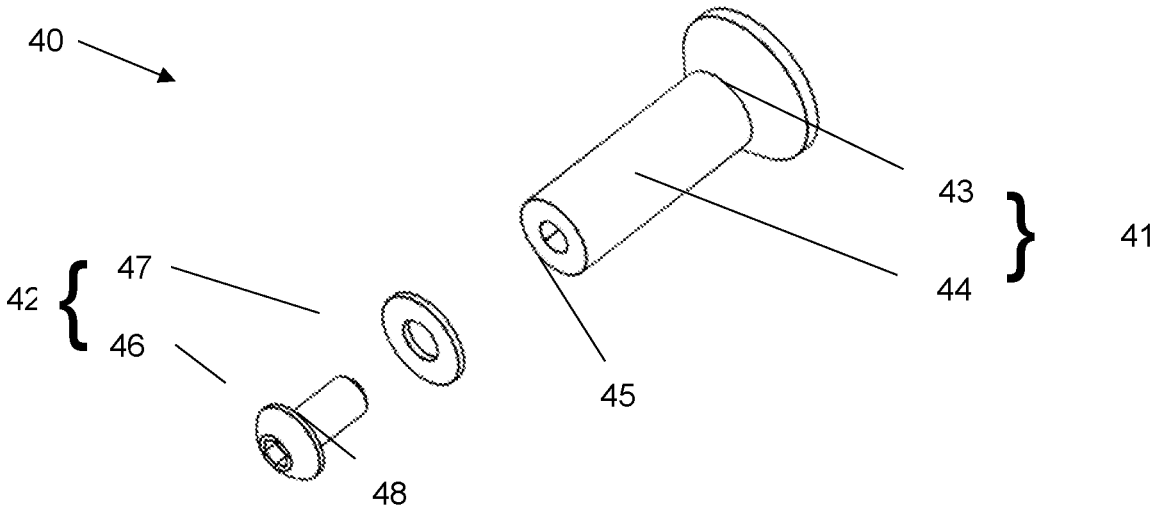
FIG. 4 shows an exploded 3d view of a fastener.

A fastener 40 is shown in FIG. 4 and comprises a bolt 41 and cap 42. The bolt 41 has a bolt-head 43 and stem portion 44. A recess 45 can be seen at the bottom end of the stem 44, opposite the bolt-head 43 end. The cap 42 comprises a cap member 46 and washer 47 and locates into the recess in the bolt stem portion 44. The cap member 46 comprises a screw portion 48 that is threadedly engaged to the stem recess 45. Similarly at least a portion of the outer surface of the stem is threaded (threads not shown in figures). The bolt-head 43 is tapered in shape.

Figure 5:
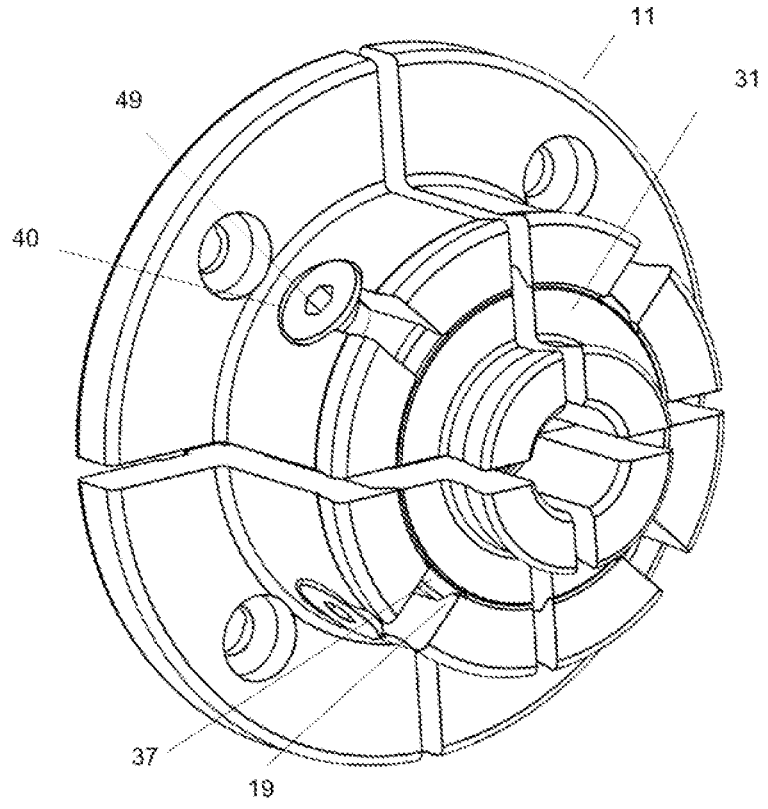
FIG. 5 shows a 3D view of an assembly comprising a kit of parts.
Figure 6:
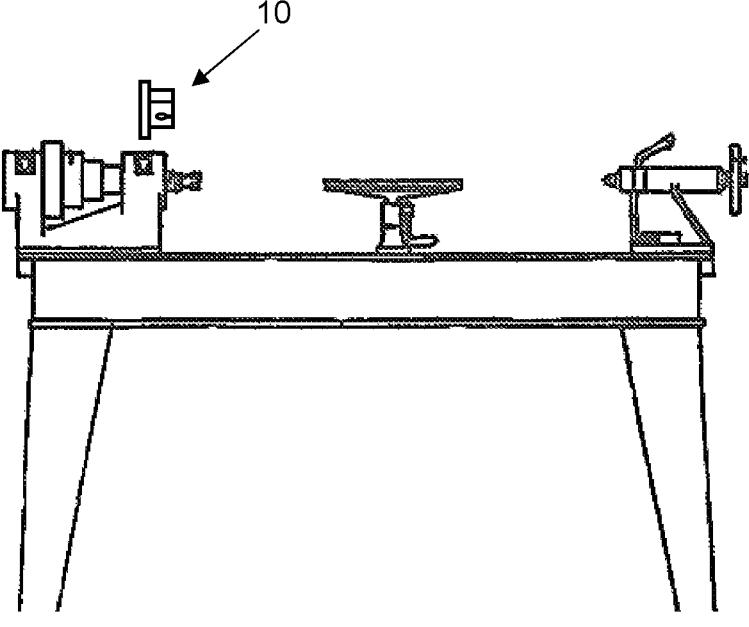
FIG. 6 shows a schematic view of a lathe showing the location of the jaw assembly.

FIG. 5 shows a jaw assembly. The second jaw members 31 are located coaxially within the first jaw set 10. Each first jaw member 11 is engaged to a second jaw member 31 via a fastener 40. The engagement surface 37 of the second jaw member 31 complements the shape of the ledge 19 of the first jaw member 31.

The fastener 40 is threaded to the aperture 34 located on the side wall of the second jaw member 31 and fastened, such as to attach the first 11 and second 31 jaw members. The tapered angle of the bolt-head 43 complements the shape of the recess 18. The bolt-head 43 has a recess 49 for receiving a key to fasten the parts together. The cap 42 prevents the fastener 40 from being disengaged completely from the second jaw member 31.

Operation

The jaw assembly defines two operational conditions for use in a lathe.

The first condition is substantially shown in FIG. 1 and comprises the first jaw set 10 only. In this condition, each of the first jaw members 11 are mounted to the slider-jaws of a chuck (not shown) via bolts in the first 13 and second 14 mounting apertures. The rib 21 and grooves on the back plate 12 engage with complementary shaped portions of the chuck. Once mounted, an item such as cylindrical wood stock may be inserted within the axially extending jaw portions and clamped by adjusting the slider-jaws on the chuck.

The second condition is shown in FIG. 5, with the first 10 and second 30 jaw sets attached together via the fastener 40. The stem portion 44 of each fastener 40 is threaded to the aperture 34 of the second jaw members 31. The cap 42 is then screwed into the recess 45 of the stem 44 preventing disengagement of the second jaw member 31 and cap 42. A substantial portion of the stem 44 remains exposed on the outer side wall of the second jaw member 31, such as to allow for the fastener 40 to be inserted into the channel 16.

With the first jaw set 10 being pre-mounted to the chuck (i.e. in the first condition), the exposed portion of the stem 44 is located into the open-end 17 of the channel and moved into the recessed section 18 such that the second jaw members are coaxially located within the axially extending first jaw members. The fastener 40 is then fastened by a key in the bolt-head 43 such that the first 11 and second 31 jaw members are locked in place together.

The bolt-head prevents the fastener 40 from sliding out of the channel 16 when the lathe is in operation. Similarly, the ledge 19 and engagement surface 37 prevent the first and second jaw members disengaging.

Once the first and second jaw sets are mounted together, an item such as a cylindrical piece of wood stock may be inserted into the second jaw members and clamped by inner surface 35 by adjusting the slider-jaws of the chuck.

It will be understood that the second jaw set is suitable for clamping objects with a smaller diameter than those on the first jaw set. This allows for smaller objects to be machined without swapping the chuck for one suitable for mounting the second jaw set 30 directly thereto, or dismounting the first jaw set 10. This saves both time and cost as it is quicker to assemble and requires less parts.

The jaw assembly may further comprise a plurality of interchangeable second jaw sets that are suitable for being mounted to the first jaw set in the second condition. The additional jaw sets may be substantially the same but each comprise distinct jaw portions such that they are each specialised for clamping different objects from one another in the second condition (for example, sizes or profiles). This allows for a range of jaw sets to be mounted to the lathe without needing to dismount the first jaw set or requiring multiple chucks. This saves time as jaw sets may require upwards of eight bolts for securing to a chuck, whereas mounting the second jaw sets only require four (for a four piece set) for mounting to the first jaw set. As only one chuck is needed to mount the whole range of second jaw sets, this also saves costs. Furthermore, the fasteners on the second jaw members are more accessible as they protrude radially and are held captive, such that they cannot be dropped.

The channel 16 also serves as a guide and quick release/attachment mechanism between the parts that can be easily done with one person only. When the fastener 40 is loosely inserted into the channel 16, the operator can let go of the second jaw member 31 which is fully supported by the first jaw member 11 mounted to the lathe (via the chuck). The operator can then use both hands to fasten the parts together.

In alternative embodiments, the first jaw set is not suitable for clamping an item to be machined in the first condition. The first jaw set serves only as an intermediate member between the lathe chuck and second jaw set such that the second jaw set can be easily mounted and dismounted to a chuck.

In further embodiments, the first and/or second jaw sets may comprise engagement members that are suitable for engaging with a spigot on an item to be machined.

The invention claimed is:

1. A jaw assembly for mounting to a lathe spindle, comprising;
   a first jaw set comprising at least one axially extending jaw portion,
   wherein the at least one jaw portion comprises a channel that extends in the same axial direction as the jaw portion,
   a second jaw set,
   wherein the second jaw set is locatable within and releasably attached to the first jaw set via at least one elongated fastener locatable in and having an axis extending in a transverse direction to the axially extending direction of the channel, and
   wherein the channel comprises an open-end for receiving the elongated fastener once the elongated fastener is received in the second jaw set, the elongated fastener being slidable along the channel to attach or detach the second jaw set, wherein tightening the elongated fastener locks the first and second jaw sets together, and wherein the elongated fastener remains held on the second jaw set when removing the second jaw set from the first jaw set.

2. The jaw assembly according to claim 1, comprising a first condition where the first jaw set is arranged to be mounted to a lathe chuck.

3. The jaw assembly according to claim 2, wherein the at least one jaw portion of the first jaw set is suitable for clamping a workpiece to be machined in the first condition.

4. The jaw assembly according to claim 2, comprising a second condition
   wherein the second jaw set is suitable for clamping a material to be machined, whilst being mounted to the first jaw set.

5. The jaw assembly according to claim 1, wherein the channel comprises a recess suitable for receiving a portion of the fastener.

6. The jaw assembly according to claim 5, wherein the recess is tapered.

7. The jaw assembly according to claim 5, wherein a depth of the channel in the recess is lower than a depth in a remainder of the channel.

8. The jaw assembly according to claim 5, wherein the fastener comprises a bolt and bolt-head, wherein the bolt-head is suitable for being received in the recess of the channel.

9. The jaw assembly according to claim 1, wherein the fastener comprises a stem that is suitable for locating through the open-end of the channel of the first jaw set.

10. The jaw assembly according to claim 9, wherein the bolt-head is tapered.

11. The jaw assembly according to claim 1, wherein the fastener comprises a captive fastener that remains held on the second jaw set when released from the first jaw set.

12. The jaw assembly according to claim 11, wherein the fastener comprises a cap that is configured to hold the fastener captive with the second jaw set.

13. The jaw assembly according to claim 1, wherein the first jaw set comprises a plurality of first jaw members, each comprising an axially extending jaw portion and channel.

14. The jaw assembly according to claim 13, wherein the second jaw set comprises a plurality of second jaw members.

15. The jaw assembly according to claim 14, wherein each of the first jaw members are releasably attached to a second jaw member via a respective fastener in its channel.

16. The jaw assembly according to claim 15, wherein the second jaw members each comprise an aperture, and where the fastener is threaddedly engaged into the aperture.

17. A jaw assembly according to claim 1, where the at least one jaw portion of the first jaw set comprises a ledge, and the second jaw set comprises at least one engagement surface, wherein the ledge and engagement surface engage when clamping a workpiece to be machined.

18. A jaw assembly according to claim 1, comprising a plurality of second jaw sets, wherein the plurality of second jaw sets are interchangeable such that any one of the second jaw sets may be releasably attached and coaxially locatable within the first jaw set via a respective fastener, and wherein the plurality of second jaw sets each comprise a unique jaw portion providing a specific jaw profile for clamping workpieces to be machined.

19. A method of using a jaw assembly according to claim 1, comprising the steps of,
   mounting the first jaw set to a lathe chuck, locating a second jaw set with a captive fastener coaxially within the first jaw set, such that the fastener locates into the channel, and fastening the fastener such that the first and second jaw sets are locked together.

* * * * *